United States Patent
Kubota (10) Patent No.: US 7,539,948 B2
(45) Date of Patent: May 26, 2009

(54) MANIPULATION MENU DISPLAY LOCATION CONTROL APPARATUS AND PROGRAM

(75) Inventor: Narushige Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 374 days.

(21) Appl. No.: 11/344,407

(22) Filed: Jan. 31, 2006

(65) Prior Publication Data

US 2006/0288307 A1   Dec. 21, 2006

(30) Foreign Application Priority Data

Jun. 17, 2005   (JP) .............................. 2005-177997

(51) Int. Cl.
 *G06F 3/048* (2006.01)
(52) U.S. Cl. ...................... 715/810; 715/808; 715/865
(58) Field of Classification Search ................. 715/808, 715/810, 865
See application file for complete search history.

(56) References Cited

U.S. PATENT DOCUMENTS

| | | | |
|---|---|---|---|
| 5,559,944 A * | 9/1996 | Ono ........................... | 715/841 |
| 6,975,304 B1 * | 12/2005 | Hawkins et al. ............. | 345/168 |
| 2003/0004983 A1 * | 1/2003 | Cohen ........................ | 707/500 |
| 2003/0011638 A1 * | 1/2003 | Chung ........................ | 345/808 |
| 2004/0160335 A1 * | 8/2004 | Reitmeier ................... | 340/825 |
| 2005/0048989 A1 * | 3/2005 | Jung ........................ | 455/456.1 |
| 2005/0140778 A1 * | 6/2005 | Kim et al. ................. | 348/14.02 |
| 2005/0204310 A1 * | 9/2005 | De Zwart et al. ............ | 715/821 |

FOREIGN PATENT DOCUMENTS

| | | |
|---|---|---|
| KR | 10-2003-0095609 | 12/2003 |
| KR | 10-2005-0047483 | 5/2004 |

* cited by examiner

*Primary Examiner*—Sara M Hanne
(74) *Attorney, Agent, or Firm*—Greer, Burns & Crain, Ltd.

(57) ABSTRACT

A manipulation menu display location control device includes a display for displaying a screen on which a plurality of predefined selection items are shown, a display location information table for storing information indicating the locations of the selection items on the display, and a receiving program for receiving an item on the screen selected by a user. A display location determining program determines the location of a manipulation menu to be shown on the display by referring to the display location information storing table based on information received by the receiving program, and a manipulation menu display program displays the manipulation menu at the location determined by the display location determining program.

17 Claims, 10 Drawing Sheets

| VITAL INPUT SCREEN 401 | 402 | | END JOB | 402 |
|---|---|---|---|---|
| BODY TEMPERATURE | | BODY TEMPERATURE | | |
| BLOOD PRESSURE-UPPER | | BLOOD PRESSURE-UPPER | | |
| BLOOD PRESSURE-LOWER | | BLOOD PRESSURE-LOWER | | |
| PULSE RATE | | PULSE RATE | | |
| HISTORY | | HISTORY | | |

| ID | BUTTON NAME | BUTTON LOCATION (RIGHT-LEFT) | BUTTON LOCATION (UPPER-LOWER) | PROGRAM |
|---|---|---|---|---|
| 01 | BODY TEMPERATURE-R | RIGHT | 01 | NUMERICAL VALUE INPUT PROGRAM |
| 02 | BLOOD PRESSURE, UPPER-R | RIGHT | 02 | NUMERICAL VALUE INPUT PROGRAM |
| 03 | BLOOD PRESSURE, LOWER-R | RIGHT | 03 | NUMERICAL VALUE INPUT PROGRAM |
| 04 | PULSE RATE-R | RIGHT | 04 | NUMERICAL VALUE INPUT PROGRAM |
| 05 | HISTORY-R | RIGHT | 06 | HISTORY DISPLAY PROGRAM |
| 06 | BODY TEMPERATURE-L | LEFT | 01 | NUMERICAL VALUE INPUT PROGRAM |
| 07 | BLOOD PRESSURE, UPPER-L | LEFT | 02 | NUMERICAL VALUE INPUT PROGRAM |
| 08 | BLOOD PRESSURE, LOWER-L | LEFT | 03 | NUMERICAL VALUE INPUT PROGRAM |
| 09 | PULSE RATE-L | LEFT | 04 | NUMERICAL VALUE INPUT PROGRAM |
| 10 | HISTORY-L | LEFT | 06 | HISTORY DISPLAY PROGRAM |
| ⋮ | ⋮ | ⋮ | ⋮ | ⋮ |

| ID | BUTTON NAME | MENU LOCATION (RIGHT-LEFT) | MENU LOCATION (UPPER-LOWER) | PROGRAM |
|---|---|---|---|---|
| 01 | BODY TEMPERATURE-R | RIGHT | LOWER | NUMERICAL VALUE INPUT PROGRAM |
| 02 | BLOOD PRESSURE, UPPER-R | RIGHT | LOWER | NUMERICAL VALUE INPUT PROGRAM |
| 03 | BLOOD PRESSURE, LOWER-R | RIGHT | LOWER | NUMERICAL VALUE INPUT PROGRAM |
| 04 | PULSE RATE-R | RIGHT | UPPER | NUMERICAL VALUE INPUT PROGRAM |
| 05 | HISTORY-R | RIGHT | UPPER | HISTORY DISPLAY PROGRAM |
| 06 | BODY TEMPERATURE-L | LEFT | LOWER | NUMERICAL VALUE INPUT PROGRAM |
| 07 | BLOOD PRESSURE, UPPER-L | LEFT | LOWER | NUMERICAL VALUE INPUT PROGRAM |
| 08 | BLOOD PRESSURE, LOWER-L | LEFT | LOWER | NUMERICAL VALUE INPUT PROGRAM |
| 09 | PULSE RATE-L | LEFT | UPPER | NUMERICAL VALUE INPUT PROGRAM |
| 10 | HISTORY-L | LEFT | UPPER | HISTORY DISPLAY PROGRAM |
| ⋮ | ⋮ | ⋮ | ⋮ | ⋮ |

FIG. 7A

| VITAL INPUT SCREEN 401 | | END JOB |
|---|---|---|
| BODY TEMPERATURE | 36.2 | BODY TEMPERATURE |
| BLOOD PRESSURE-UPPER | | BLOOD PRESSURE-UPPER |
| BLOOD␣ | 1 2 3 4 5 6 | BLOOD PRESSURE-LOWER |
| PULSE R | 7 8 9 0   C | PULSE RATE |
| HISTORY | END | HISTORY |

| VITAL INPUT SCREEN 401 | | 1 2 3 4 5 6 |
|---|---|---|
| BODY TEMPERATURE | | BODY TI   7 8 9 0   C |
| BLOOD PRESSURE-UPPER | | BLOOD␣   END |
| BLOOD PRESSURE-LOWER | | BLOOD PRESSURE-LOWER |
| PULSE RATE | | PULSE RATE   8.2 |
| HISTORY | | HISTORY |

MANIPULATION MENU DISPLAY LOCATION CONTROL APPARATUS AND PROGRAM

FIELD OF INVENTION

The present invention relates to an apparatus and a program for controlling a display screen. More particularly, the present invention relates to a system for controlling the location of a manipulation menu on a display screen.

BACKGROUND OF THE INVENTION

A system utilizing a touch panel has been introduced in various fields. A user can realize the desired processes by directly touching a menu displayed on the touch panel of a display screen or a manipulation panel without a keyboard.

In the touch panel system, it is sometimes difficult to effectively use the touch panel depending on the installation environment of the touch panel and the dominant hand of the user. An example of this is a touch panel installed next to a bed in a medical institution. When a manipulation button is provided on the right side of a display screen and a user (a nurse, for example) manipulates a button from the left side of a bed, the user's hand covers the display screen, making it difficult to see the display screen for the user and others (especially, the patient in bed) viewing the screen. A similar problem may happen to a teller of a financial institution, for example.

In cases where a display screen is intended to be used by a number of users in a public or a private space, a manipulation button on the right side of the screen, makes it difficult for a left-handed user, because the left hand would block the screen during use.

One known method for solving this problem provides a dedicated button for moving the menu to a different part of the screen. In this case, however, the button for moving the menu may itself, contribute to the problem that it is intended to solve. For example, the location of the button may not be preferable or may be awkward to the same users. Further, the dedicated button occupy screen space, and the initial location of the button may be such that reaching for this button causes the view of the screen to be blocked.

Another known method detects the behavior of a user with an optical sensor, judges the dominant hand of the user and determines the side where the manipulation button should be displayed on the basis of the result of such judgment. However, the results are not always accurate.

SUMMARY OF THE INVENTION

The present invention is directed to a manipulation menu display location control device including a display for displaying a screen on which a plurality of predefined selection items are shown, a display location information table for storing information indicating the locations of the selection items on the display, and a receiving program for receiving an item on the screen selected by a user. A display location determining program determines the location of a manipulation menu to be shown on the display by referring to the display location information storing table based on information received by the receiving program, and a manipulation menu display program displays the manipulation menu at the location determined by the display location determining program.

DETAILED DESCRIPTION OF THE INVENTION

Figure 1:
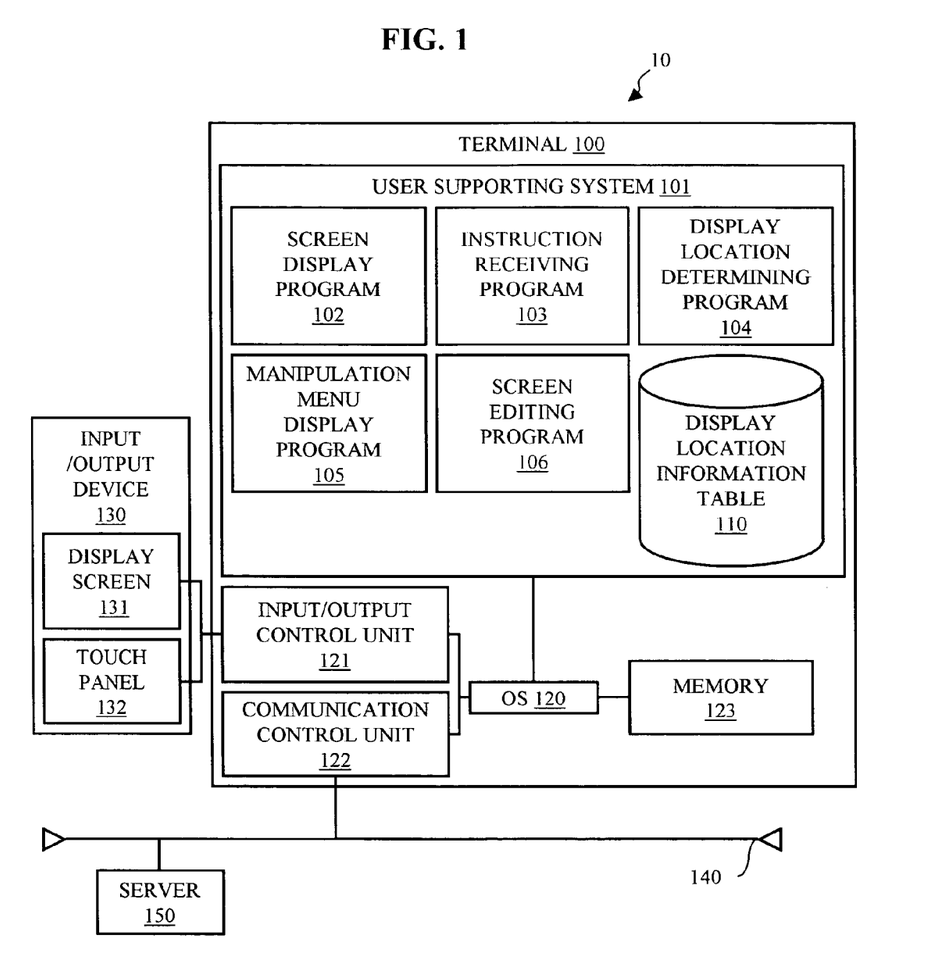
FIG. 1 is a menu display control system in accordance with one embodiment of the present invention.

Turning to FIG. 1, a menu display control system 10 in accordance with one embodiment of the present invention includes a terminal 100 connected to a server 150 via a network 140 such as a LAN, a WAN, or the Internet. In one embodiment, the system 10 is implemented in a user supporting system utilizing bed-side terminals provided in a medical institution. It should be understood, however, that the menu display control system 10 may be implemented in other environments where a display screen is used for performing various touch panel or manipulating panel functions such as, for example, obtaining account information of a person in a financial institution, finding the apartment number of a person in a building, or withdrawing cash from an automatic teller machine (ATM). In FIG. 1, only one terminal 100 is illustrated. However, a plurality of terminals 100 may be connected to the server 150 through the network 140.

The server 150 includes at least an electronic medical chart system and a medical office-work supporting system, for example, if the control system 10 is implemented in a medical institution. A user supporting system 101 provided in the terminal 100 is adapted to access data in the server 150, and also input and output data to and from the server.

The terminal 100, including the user supporting system 101, is controlled by an operating system (OS) 120. The user supporting system 101 includes various programs for supporting information referenced and input by the user. These programs include a screen display program 102 for displaying information on a display screen 131, an instruction receiving program 103 for receiving instructions from the user, and a display location determining program 104 for determining the location of a manipulation menu (described below) on the display screen. The user supporting system 101 further includes a manipulation menu display program 105 for displaying the manipulation menu, and a screen editing program 106 for editing the display screen 131. The user supporting system 101 also includes a display location information table 110 for storing the display location information of each menu item displayed on the display screen 131. The display location information table 110 is referred to or updated, as required, from any of the programs 102, 103, 104, 105 and 106 of the user supporting system 101.

The menu display control system 10 is also provided with an input/output device 130 in communication with the terminal 100 for presenting various information to and accepting instructions from the user. The input/output device 130 includes a display screen 131, such as an LCD panel, and a touch panel 132 incorporated in the display screen for accepting inputs from the user. The terminal 100 further includes an input/output control unit 121 for controlling the input/output device 130 and a communication control unit 122 for controlling communication with the server 150.

Figure 2:
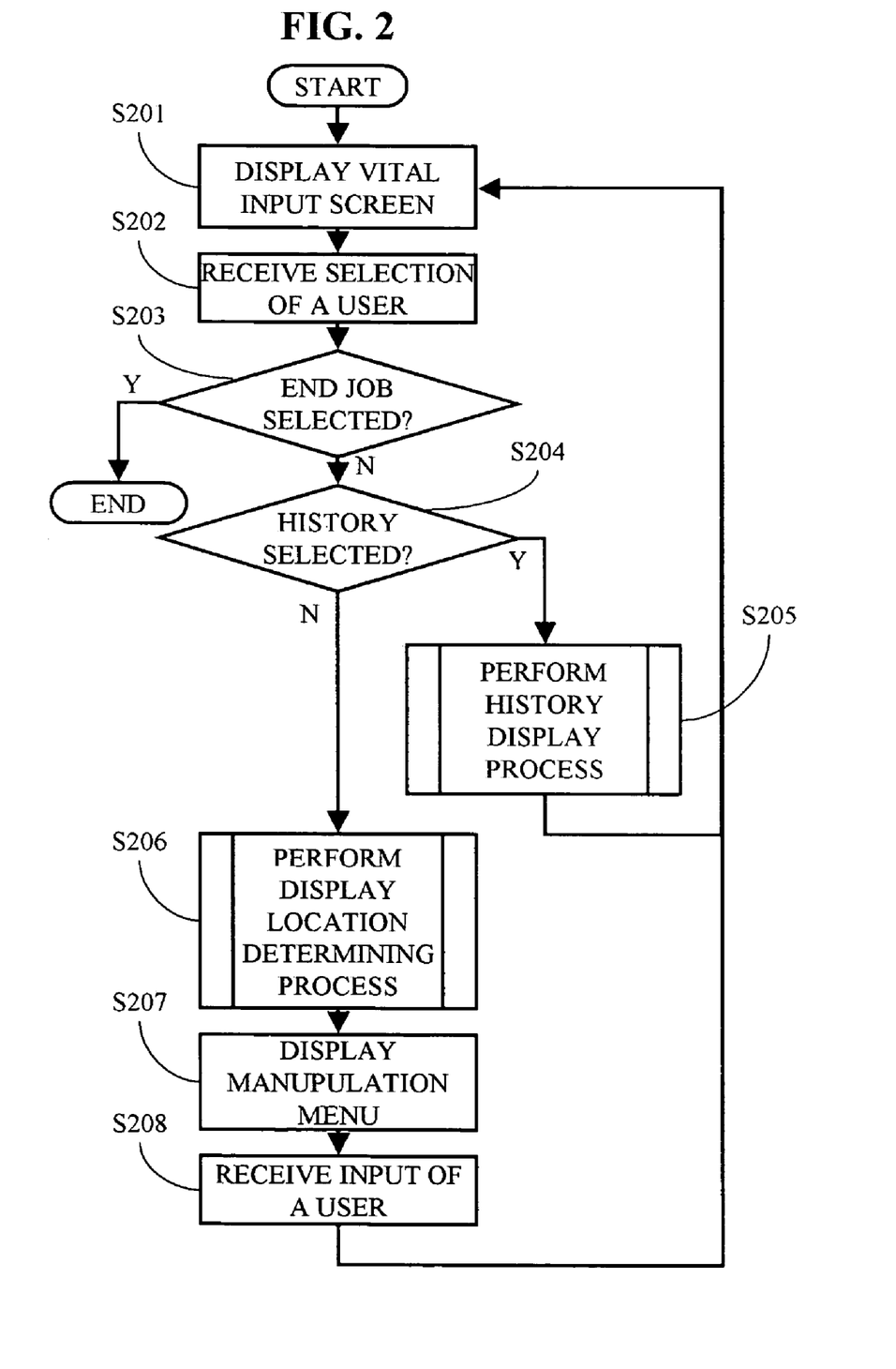
FIG. 2 is a flowchart for describing the process for displaying a manipulation menu in the menu display control system shown in FIG. 1.
Figure 3:
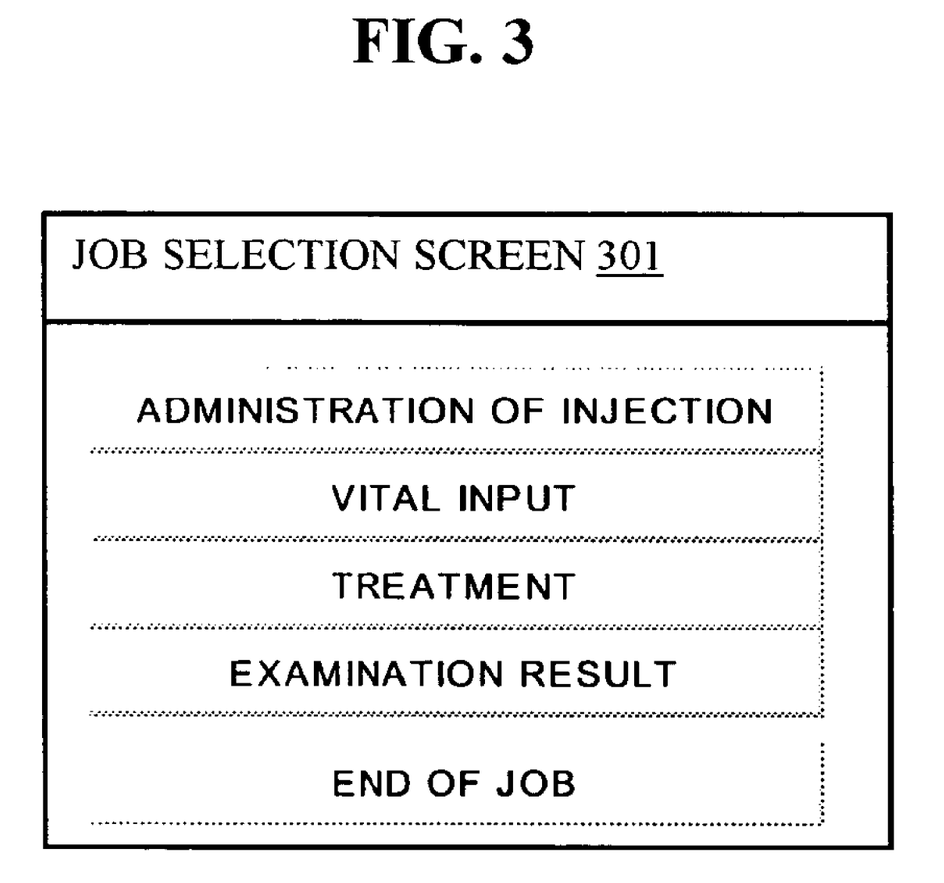
FIG. 3 is a sample selection screen for selecting the type of job to be performed.

Referring to FIG. 2 and in operation, when a user inputs information of a patient or refers to the information of a patient, the user manipulates the input/output device 130 installed at or near the patient's bed. The different types of information are displayed on the display screen 131 as a job selection screen. An example of the job selection screen 301 is shown in FIG. 3.

Figure 4:
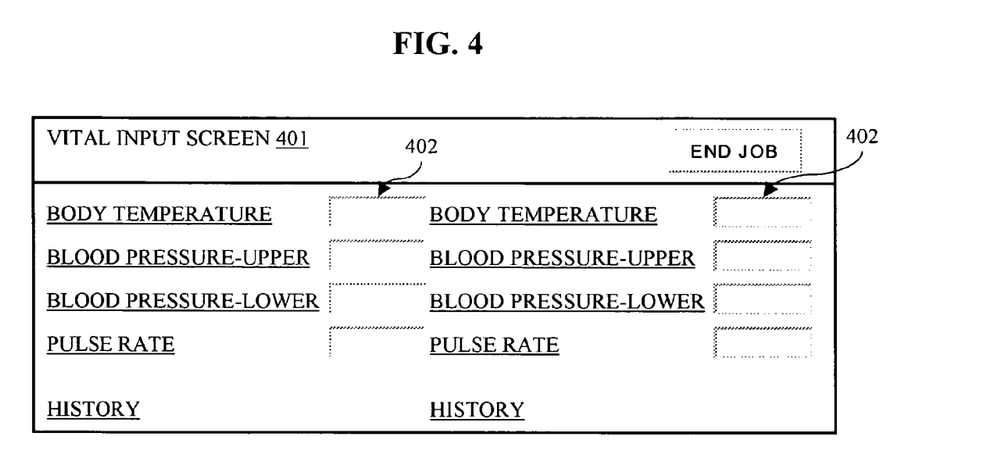
FIG. 4 is a sample input screen selected from the job selection screen shown in FIG. 3.

FIG. 2 describes an example in which VITAL INPUT is selected from the job selection screen 301. First, the screen display program 102 displays the VITAL INPUT screen 401 (S201). An example of the VITAL INPUT screen 401 is illustrated in FIG. 4. The VITAL INPUT screen 401 is used for inputting vital information of a patient and includes the fields for inputting the body temperature, blood pressure, and pulse rate, for example. Each input item or button on the VITAL INPUT screen 401 can be selected by directly touching or depressing the button on the screen or by using a cursor or a keyboard, to choose the described operation.

The same input items and corresponding input fields 402 are provided on both the right and left sides of the vital input screen 401, to enable the user to input data from either side of the screen, since the user supporting system 101 does not initially recognize preferred side of the user. Next, the receiving program 103 receives the input item selected by the user in the VITAL INPUT screen 401 (S202). When the END JOB button is selected from the VITAL INPUT screen 401, the VITAL INPUT process is completed (S203), and when the HISTORY button is selected, the history display process (which is described below) is executed (S205).

When the user selects an operation other than HISTORY or END JOB on the VITAL INPUT screen 401, the display location determining process by the display location determining program 104 is executed (S206). This process determines the display location of a numerical value input screen for entering values in the input fields 402 corresponding to the input items or buttons selected by the user.

Figure 5:
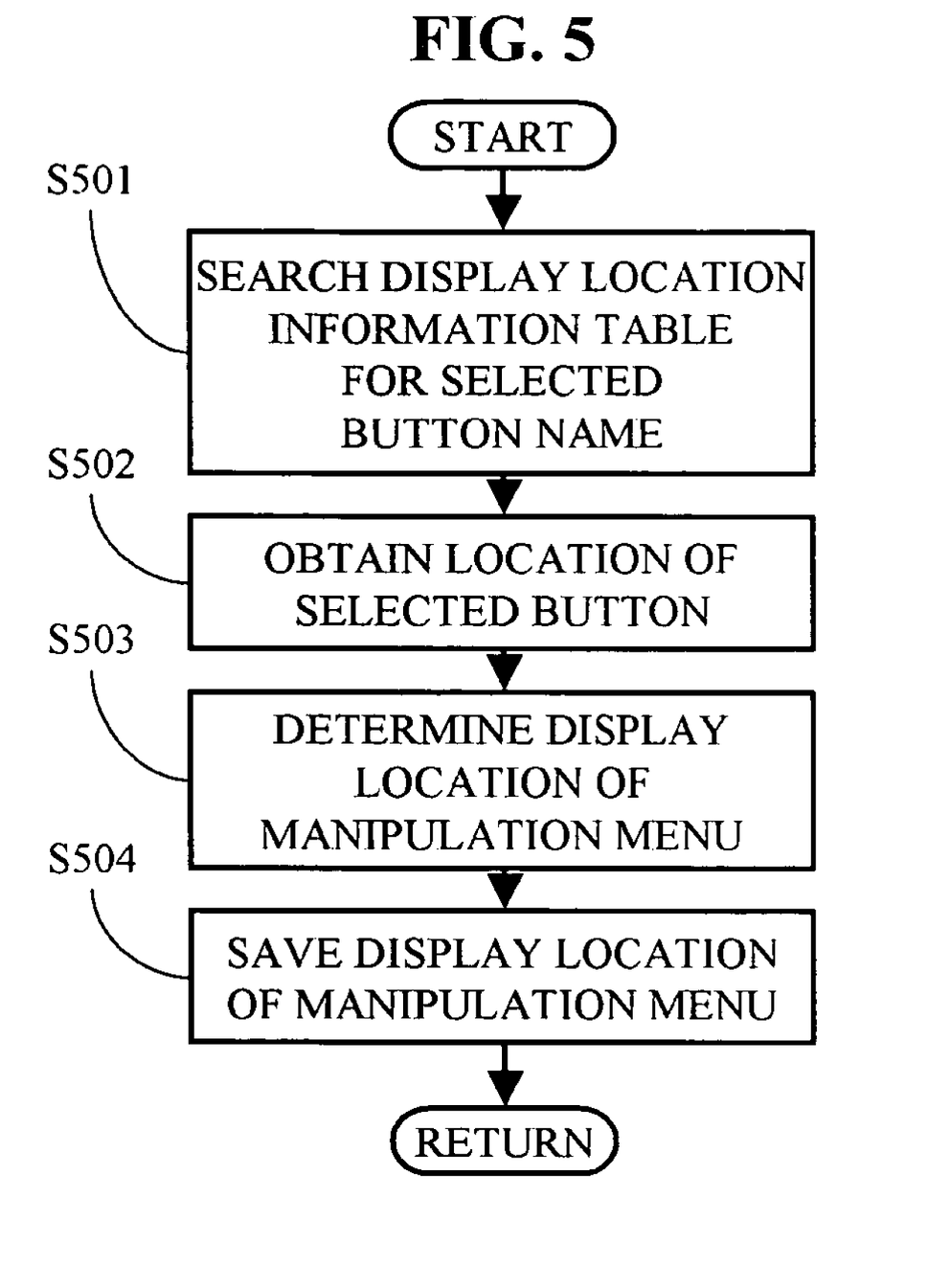
FIG. 5 is a flowchart of a process for determining the display location of a manipulation menu.
Figure 6A:
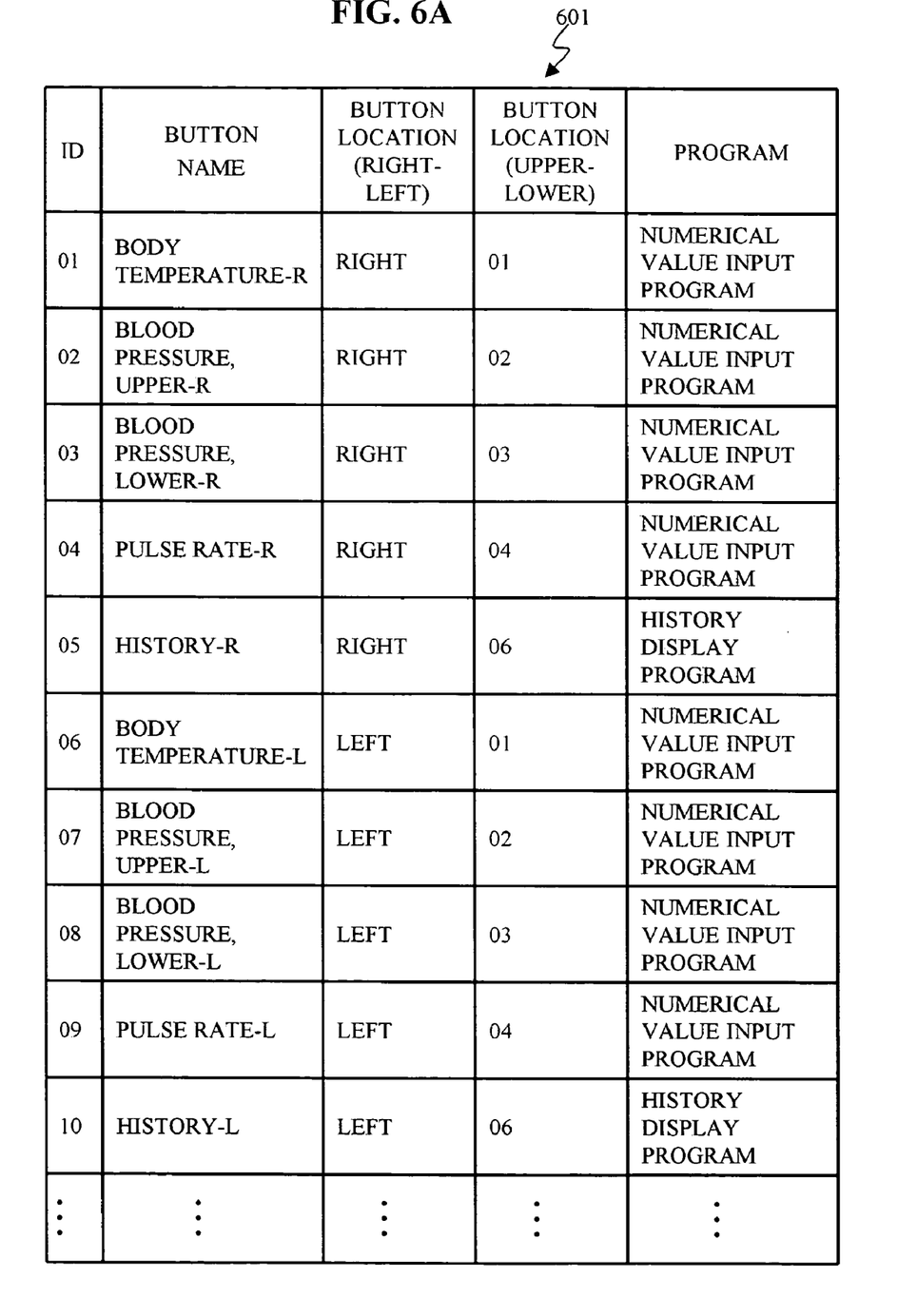
FIG. 6A is a sample representation of one embodiment of the display location information table shown in FIG. 1.

The display location determining process S206 is explained using the flowchart of FIG. 5. First, the display location information table 110 is searched using an identifier of the input item or button selected by the user on the VITAL INPUT screen 401 (S501). A representation 601 of the display location information table 110 is illustrated in FIG. 6A, and includes columns for the names of the input items or buttons on the VITAL INPUT screen 401 (BUTTON NAME), the location of the input buttons (BUTTON LOCATION (RIGHT-LEFT)), another location of the input button (BUTTON LOCATION (UPPER-LOWER)), and the names of the programs to be run when the input button is selected (PROGRAM).

When the user selects the BODY TEMPERATURE input button located in the left side of the VITAL INPUT screen 401, for example, the display location information table 601 is searched in the step S501 using the identifier BODY TEMPERATURE-L linked to this button as the search key. The information LEFT is acquired indicating the location (left or right side of the VITAL INPUT screen 401) of the selected button by referring to the BUTTON LOCATION (RIGHT-LEFT) column of the identified record (S502). Here, the information "01" is acquired from the BUTTON LOCATION (UPPER-LOWER) column indicating the upper location of the button on the VITAL INPUT screen 401.

Next, the location of the manipulation menu to be displayed on the VITAL INPUT screen 401 is determined by the display location determining program 104 on the basis of the information acquired in the step S502 (S503). First, it can be understood from the information LEFT acquired in the step S502 that the input button exists on the left side of the VITAL INPUT screen 401. This indicates that the user is on the left side of the terminal or the user is left-handed. In this case, it is judged that the user can use the terminal more effectively by displaying the manipulation menu on the left side of the VITAL INPUT screen 401.

Next, the display location of the manipulation menu along the upper and lower locations of the VITAL INPUT screen 401 is determined. The location of the input button is divided, from the upper side, sequentially into six stages of BODY TEMPERATURE=01, BLOOD PRESSURE-UPPER=02, BLOOD PRESSURE-LOWER=03, PULSE RATE=04, blank space=05 and HISTORY=06 as illustrated in the BUTTON LOCATION (UPPER-LOWER) column of the display location information table 601. In this embodiment, these six stages are divided into two groups including an upper stage (01 to 03) and a lower stage (04 to 06). When the input buttons located in the lower stage are selected, the manipulation menu to be displayed next is displayed on the upper side, and when the buttons located in the upper stage are selected, the manipulation menu to be displayed next is displayed on the lower side. In this manner, the problem of the selected input items being hidden by the manipulation menu is prevented.

In the explanation above, it is assumed that the button "BODY TEMPERATURE L" is selected. Accordingly, it can be understood that the BUTTON LOCATION (UPPER-LOWER) is "01" and this button is located in the upper stage. Therefore, it is determined that the manipulation menu is to be displayed on the lower side of the VITAL INPUT screen 401, and to the left as determined above by the display location determining program (104).

Therefore, the information "lower left side" is saved in a memory area 123 provided in the user supporting system 101 (S504). When the display location determining process (S206) is completed, the manipulation menu is displayed on the VITAL INPUT screen 401 (S207). The program for this process is set in the PROGRAM column of the display location information table 601. In this case, the NUMERICAL VALUE INPUT PROGRAM is run by the manipulation menu display program 105.

Figure 7A:
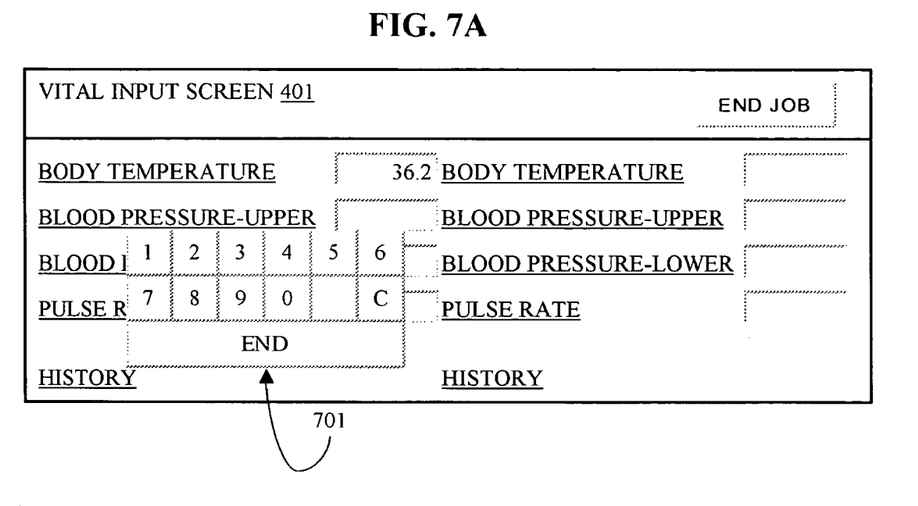
FIG. 7A is a diagram showing the location of the manipulation menu on the input screen shown in FIG. 4.

An example of a manipulation menu 701 is illustrated in FIG. 7A. The manipulation menu 701 is displayed in the lower left side of the VITAL INPUT screen 401 based on the information "lower left side" which has been determined and saved in the display location determining process (S206). The manipulation menu 701 is an input pad for inputting numerical values of the vital information and includes numerical buttons, a clear button (C), and an end (END) button. Since the numerical value inputted here is displayed in the input field of the VITAL INPUT screen 401, a numerical value indicator is not required for the manipulation menu. The user inputs the numerical value by selecting the buttons on the manipulation menu 701 and thereafter selecting the END button (S208). The manipulation menu 701 is then closed and the VITAL INPUT screen 401 is displayed again in the state shown in FIG. 4 (S201).

Figure 7B:
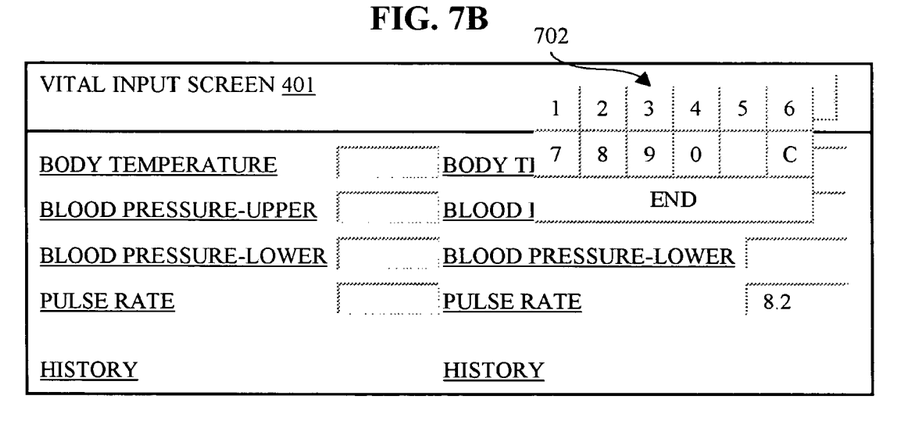
FIG. 7B shows a manipulation menu displayed at another location on the input screen shown in FIG. 4.

FIG. 7B shows the location of a manipulation menu 702 in an example where the PULSE RATE button located at the right side of the VITAL INPUT screen 401 has been selected. In this case, it can be understood the PULSE RATE button is located at the lower stage (04) on the right side of the screen by referring to the record corresponding to the PULSE RATE-R button of the display location information table 601 (shown in FIG. 6A). Therefore, it is determined that the display location of manipulation menu 702 is the upper right side of the screen as explained above.

Figure 6B:
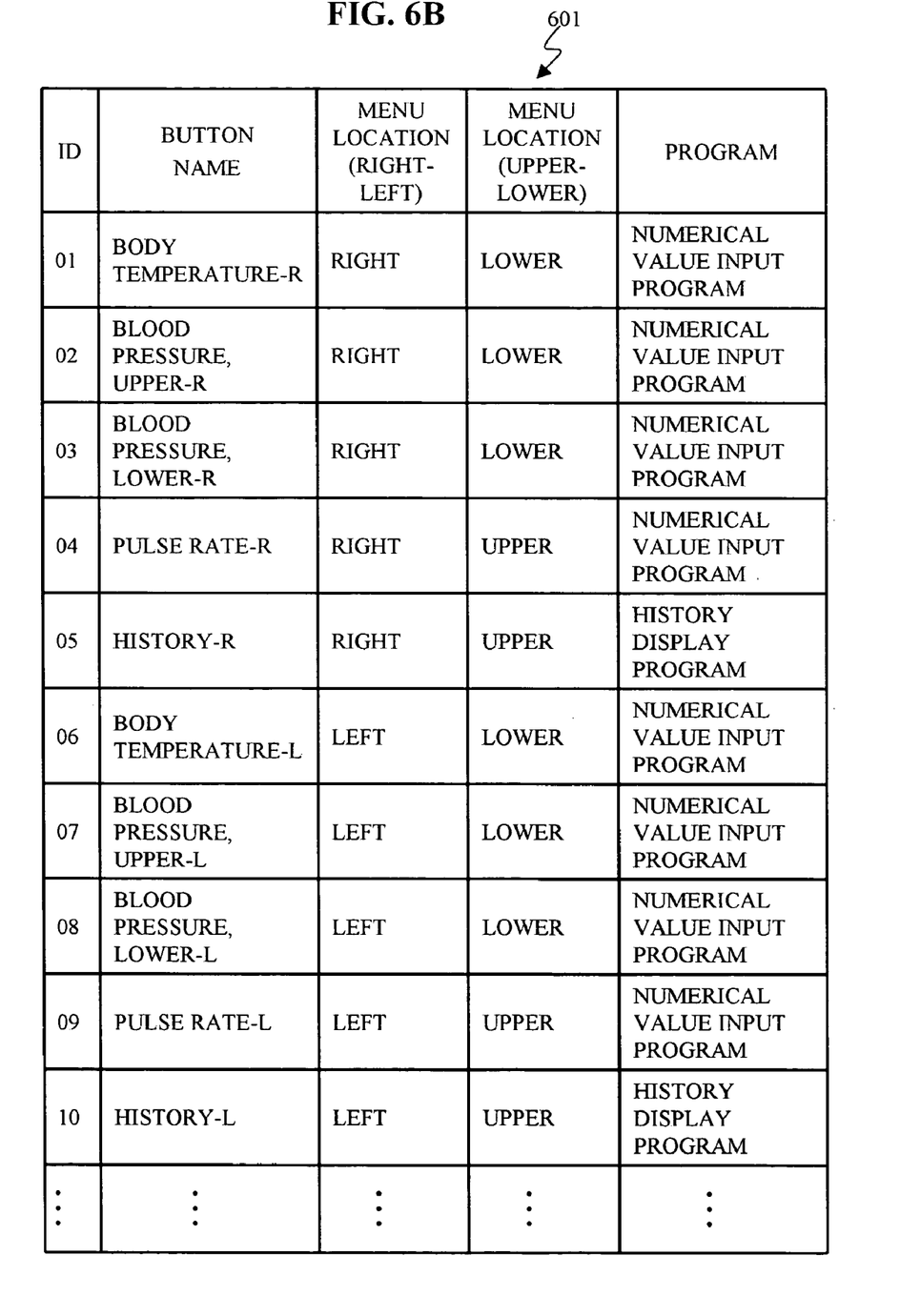
FIG. 6B is a sample representation of another embodiment of the display location table shown in FIG. 1.

The format or the structure of display location information table 601 described above indicates the locations of the input buttons on the VITAL INPUT screen 401 depressed by the user. However, the display location information table 110 is not limited to the format explained above and can employ any format which can provide the similar effect. For example, it is also possible to form a structure by storing the location of the manipulation menu to be displayed on the input screen 401, directly in the display location information table 601, instead of the location of the button selected on the VITAL INPUT screen 401. This format is illustrated in FIG. 6B. Accordingly, the BUTTON LOCATION (RIGHT-LEFT) and the BUTTON LOCATION (UPPER-LOWER) columns of the table 601 might be labeled MENU LOCATION (RIGHT-LEFT) and MENU LOCATION (UPPER-LOWER), respectively, to indicate the location of the manipulation menu to be displayed on the VITAL INPUT screen 401, rather than the location of the button depressed on the VITAL INPUT screen.

It should be understood, then, that in this embodiment, the data in the MENU LOCATION (RIGHT-LEFT) and MENU LOCATION (UPPER-LOWER) are predetermined so that when the record corresponding (i.e., linked) to the button selected from the VITAL INPUT screen 401 is located in the display location information table 601, the location of the menu is immediately known from the MENU LOCATION (RIGHT-LEFT) and the MENU LOCATION (UPPER-LOWER) columns. In other words, the data in these two columns are predetermined so that the step for determining the location of the manipulation menu is not required.

Next, the history display process (S205) which is executed when the HISTORY button is depressed in the VITAL INPUT screen 401 is explained. This process might be executed when referring to the past information stored in the server 150. This may be useful, for example, when a user is explaining the present condition of a patient at the bedside while the two parties are watching the display screen 131. In this example, it is assumed that the user is standing on the left side of the display screen 131, while the patient is to the right thereof.

First, the input buttons (HISTORY) indicating the identical operations are allocated on the right and left sides of the VITAL INPUT screen 401 (shown in FIG. 4). The user depresses or selects the HISTORY button which is nearer to the user, i.e., the user depresses the HISTORY button located on the left side of the screen 401. The history display process is then executed (S205), which is described while referring to FIG. 8.

Figure 8:
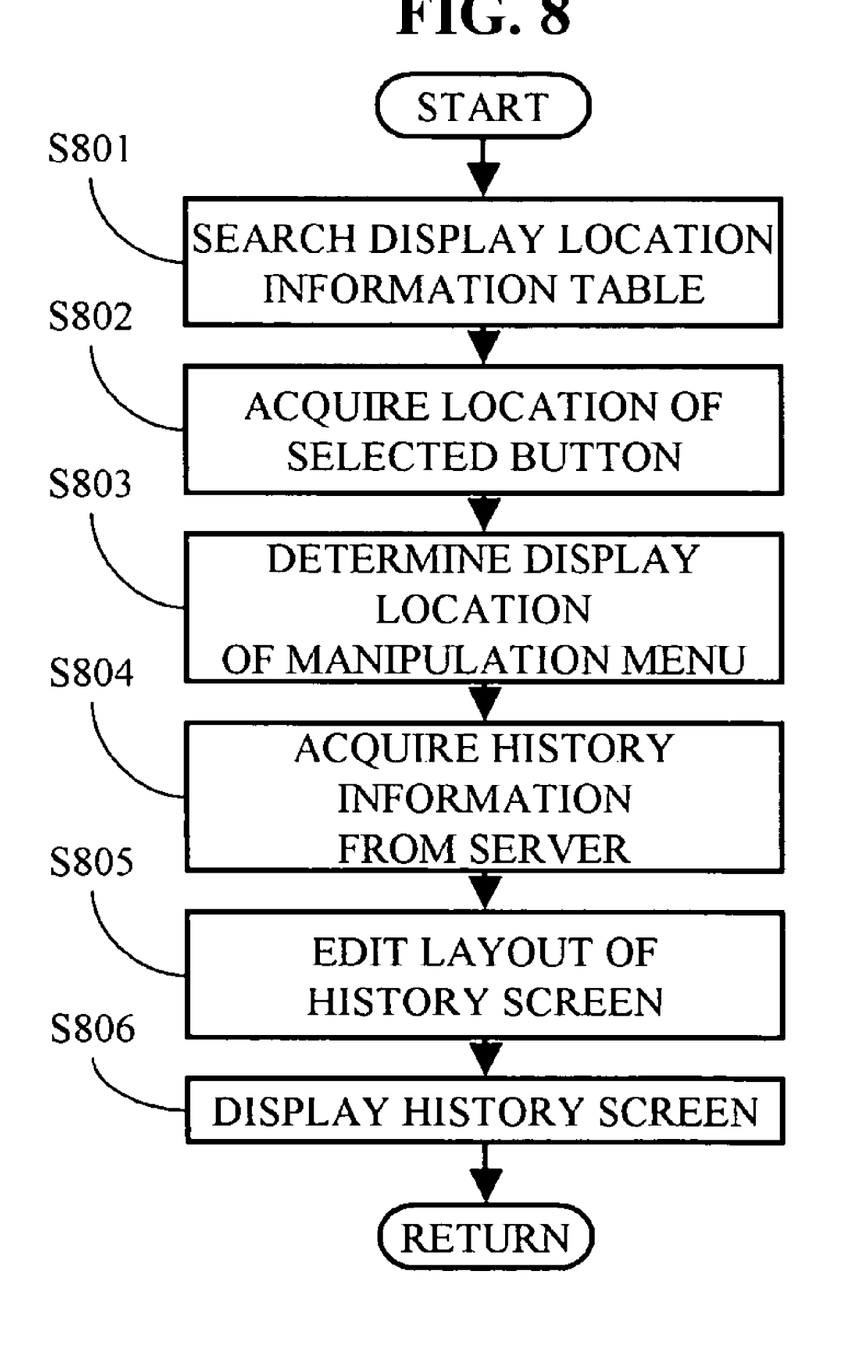
FIG. 8 is a flowchart of a process for locating a manipulation menu in accordance with another embodiment of the present invention.

First, the display location information table 110 is searched using the record of the button selected by the user (S801). When the user selects the HISTORY button located on the left side of the screen in the vital input screen 401, the display location information table 601 is searched by the display location determining program 104 using the record HISTORY-L or linked to this button as the search key. The information LEFT may be acquired as the right or left location of the button by referring to the BUTTON LOCATION (RIGHT-LEFT) column (S802). In this case, it is assumed that the display for showing the patient's past vital information, (a HISTORY screen 901) is similar in size as the VITAL INPUT screen 401. Therefore, the upper and lower location information of the button depressed is not acquired, since the HISTORY screen would hide the VITAL INPUT screen 401.

Figure 9A:
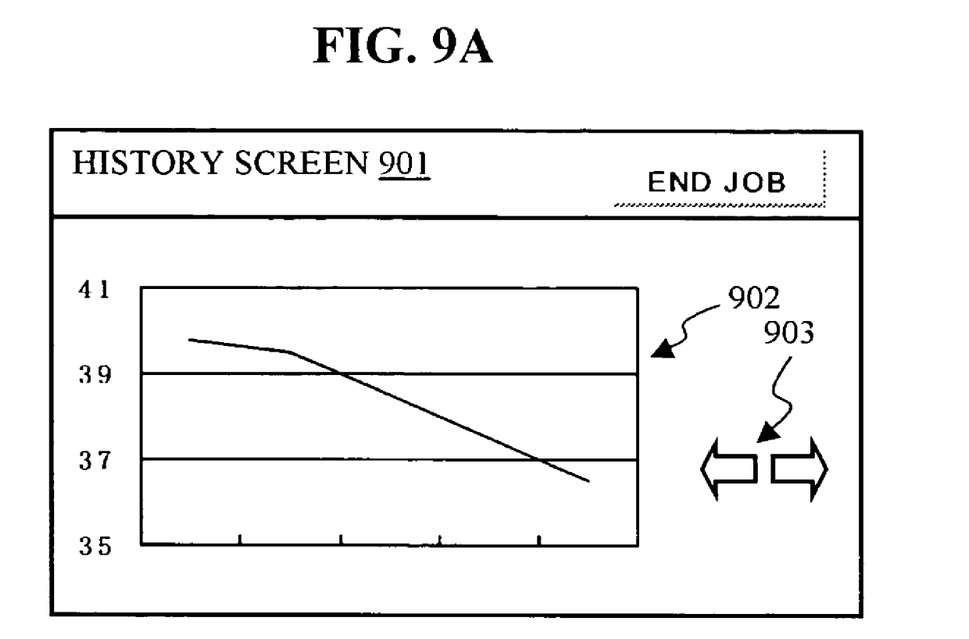
FIGS. 9A and 9B are sample screens showing the locations of a manipulation menu as described in the flowchart of FIG. 8.

Next, the location of the manipulation menu to be displayed on the HISTORY screen 901 is determined by the display location determining program 104 (S803) based on the information acquired in the step S802. One example of a HISTORY screen 901 is shown in FIG. 9. This example illustrates a graph (902) which has been generated based on the body temperatures of the patient in the past. This information is obtained from the server 150. While both the user and the patient are watching this screen 901, the patient is able to freely scroll the graph 902 in order to check the information in the past which is not displayed on the graph. The buttons 903 for this purpose are indicated as the arrow-mark buttons on the right side of the history screen 901.

When these buttons 903 are allocated on the right side of the screen 901, there is no problem. However, if these buttons 903 are allocated on the left side of the screen 901 and the patient is on the right side, the graph 902 is hidden by the patient's hand when the patient attempts to manipulate the screen. For this reason, when the patient is on the right side of the screen 901, the manipulation menu 903, i.e., the buttons, is displayed on the right side of the screen as in the HISTORY screen 901. However, when the patient is on the left side of the screen, the manipulation menu 903 is displayed on the left side of the screen as in the HISTORY screen 904 (shown in FIG. 9B).

In step S803, it is understood that the HISTORY button is on the left side of the VITAL INPUT screen 401 (shown in FIG. 4) from the information LEFT obtained in the step S802. In other words, it indicates that the user is on the left side of the terminal 101. Since the patient is on the right side of the terminal, the manipulation buttons are desirably allocated on the right side of the screen. From this, it is determined that the manipulation menu 903 is displayed on the right side as shown in the HISTORY screen 901.

Figure 9B:
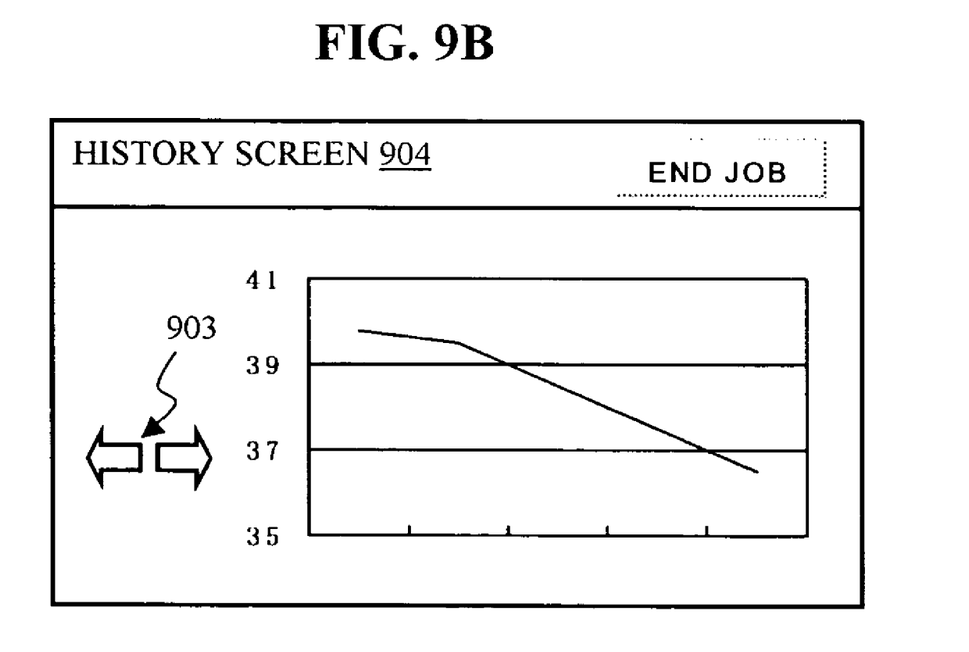

In contrast, when the HISTORY button on the right side is selected on the VITAL INPUT screen 401, this indicates that the user is on the right side of the terminal 101 and the patient is on the left side of the terminal. Accordingly, it is determined that the manipulation menu 903 is provided on the left side as shown in the HISTORY screen 904.

Thereafter, the body temperature history information of the patient is obtained from the server 150 (S804) via the communication control unit 122. The screen editing program 106 allocates the manipulation menu 903 on the right side of the HISTORY screen 901 based on the information determined in step S803 and also allocates the graph 902 of the history information obtained in the step S804 on the left side of the HISTORY screen (S805). When this is completed, the screen display program 102 displays the HISTORY screen 901 (S806).

As described above, even when only one terminal is used with a plurality of users, the manipulation menu is displayed automatically on the side of the intended user.

Also, the present invention enables display of a manipulation menu to the area suitable for manipulation environment without providing a dedicated button for moving the menu to different parts of the display screen.

Each program explained in the embodiment of the present invention can be distributed by storing in a recording medium such as CD-ROM and the processes as described above can be attained by installing the programs in a computer using such recording medium.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A manipulation menu display location control apparatus comprising:
    displaying unit which displays a first display screen on which a plurality of first selection items each having a predefined function are allocated;
    receiving unit which receives a first item on said first display screen selected from said first selection items by a user, wherein said displaying unit displays a second display screen showing a plurality of second selection items each having a predefined function and third selection items each being a duplicate of said predefined functions of said second selection items, when said first item is received by said receiving unit;
    display location information storing unit which stores information indicating locations of said selection items on said second display screen;
    display location determining unit which determines a display location of a manipulation menu corresponding to a second item on said second display screen selected from said second or third selection items on said second display screen by referring to said display location information storing means based on said second item received by said receiving unit; and
    manipulation menu display unit which displays said manipulation menu at the location on said second display screen determined by said display location determining unit.

2. The apparatus as defined in claim 1, wherein said selection items on said first display screen are linked to said information stored in said display location information storing means.

3. The apparatus as defined in claim 2, wherein said information stored in said display location information storing means are a plurality of records each corresponding to one of said plurality of selection items on said first display screen.

4. The apparatus as defined in claim 2, wherein said user selects said first item via a touch panel cooperatively incorporated in said first display screen.

5. The apparatus as defined in claim 2, wherein said manipulation menu includes a plurality of predefined selection items that are selected for entering data on said second display screen relating to said second item selected.

6. The apparatus as defined in claim 1, wherein said manipulation menu is located on said second display screen.

7. The apparatus as defined in claim 6, wherein said display location of said manipulation menu is offset from the location of said second item on said second display screen.

8. The apparatus as defined in claim 1, further comprising screen editing means for editing said second display screen on which said manipulation menu is allocated including locating said manipulation menu on said second display means relative to an image manipulated by said manipulation menu.

9. A manipulation menu display location control apparatus comprising:
    displaying unit which displays a first display screen on which a plurality of first selection items each having a predefined function are allocated;
    receiving unit which receives a first item selected from said first selection items by a user on said first display screen wherein said displaying unit displays a second display screen showing a plurality of second selection items each having a predefined function and third selection items each being a duplicate of said predefined functions of said second selection items, when said first item is received by said receiving unit;
    display location information storage unit which stores information indicating locations of said selection items on said second display screen;
    display location determining unit which determines a display location of a manipulation menu corresponding to a second item on said second display screen selected from said second or third selection items on said second display screen by referring to said display location information storing means based on said second item received by said receiving unit; and
    manipulation menu display unit which displays said manipulation menu at the location on said second display screen determined by said display location determining unit.

10. The apparatus as defined in claim 9, wherein said selection items on said first display screen are linked to said information stored in said display location information storing means.

11. The apparatus as defined in claim 10, wherein said user selects said first item via a touch panel cooperatively incorporated in said display screen.

12. The apparatus as defined in claim 10, wherein said manipulation menu includes a plurality of predefined selection items that are selected for entering data on said second display screen relating to said second item selected.

13. The apparatus as defined in claim 9, wherein said manipulation menu is located on said second display screen.

14. The apparatus as defined in claim 13, wherein said display location of said manipulation menu is offset from the location of said second item on said second display screen.

15. The apparatus as defined in claim 9, further comprising screen editing means for editing said second display screen on which said manipulation menu is allocated including locating said manipulation menu on said second display means relative to an image manipulated by said manipulation menu.

16. A computer readable medium storing a computer program having instructions for controlling a computer to perform the steps comprising:
    displaying a first display screen on which a plurality of predefined selection items each having a predefined function are allocated;
    receiving a first item on said display screen selected from said selection items by a user;
    displaying a second display screen showing a plurality of second selection items each having a predefined function and third selection items each being a duplicate of said predefined functions of said second selections items, when said first item is received by said receiving means;

storing information indicating locations of said selection items on said second display screen;

determining a display location of a manipulation menu corresponding to a second item on said second display screen selected from said second or third selection items on said second display screen by referring to a display location information storing means for storing information indicating locations of said selection items on said display screen, based on said receiving of said item on said display screen selected by the user; and displaying said manipulation menu at the location on said second display screen determined by said display location determining step.

17. A computer readable medium storing a computer program having instructions for controlling a computer to perform the steps comprising:

displaying a first display screen on which a plurality of predefined selection items each having a predefined function are allocated;

receiving a first item on said display screen selected from said selection items by a user;

displaying a second display screen showing a plurality of second selection items each having a predefined function and third selection items each being a duplicate of said predefined functions of said second selections items, when said first item is received by said receiving means;

storing information indicating locations of said selection items on said second display screen;

determining a display location of a manipulation menu corresponding to a second item on said second display screen selected from said second or third selection items on said second display screen by referring to a display location information storing means for storing information indicating predefined locations of manipulation menus corresponding to said selection items on said display screen, based on said receiving of said item on said display screen selected by the user; and displaying said manipulation menu at the location on said second display screen determined by said display location determining step.

* * * * *